May 13, 1958     C. C. THOMPSON     2,834,108
KNIFE
Filed Jan. 19, 1956
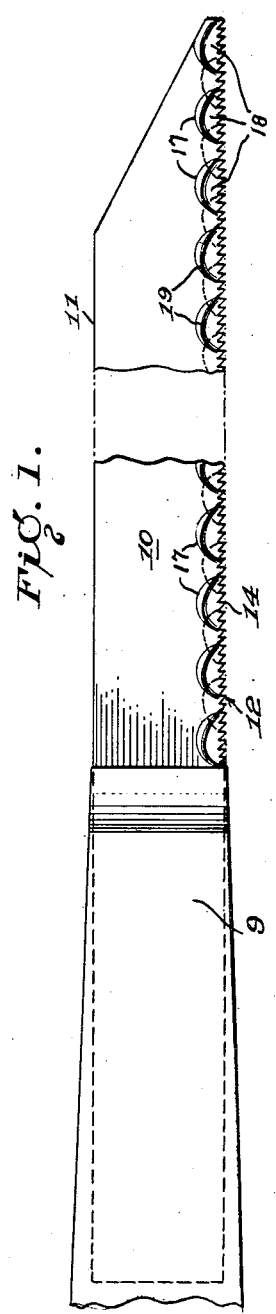
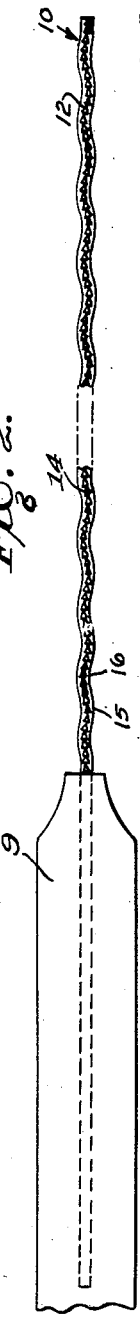
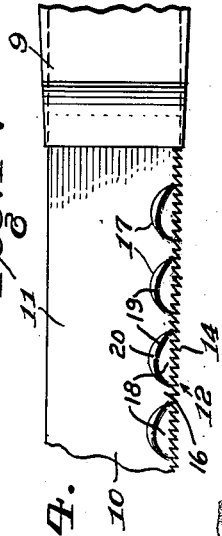
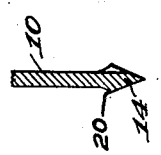
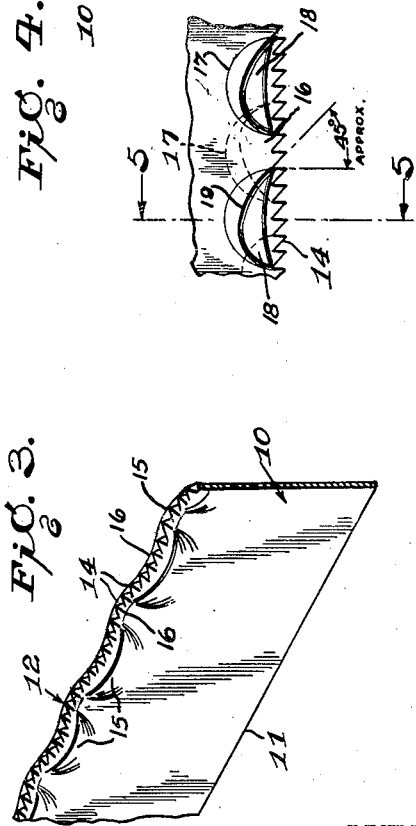
INVENTOR
Charles C. Thompson.
BY *Emery C. Groff*
ATTORNEY United States Patent Office 2,834,108
Patented May 13, 1958

2,834,108

KNIFE

Charles C. Thompson, Lakewood, N. J.

Application January 19, 1956, Serial No. 560,138

1 Claim. (Cl. 30—355)

The present invention relates to a knife formed with a serrated sinuous cutting edge.

It is an object of the present invention to provide a knife having a blade which is provided with ground surfaces bounded by ridge-like curves on each side thereof and arranged in reverse directions with respect to the knife handle, whereby each fore and aft reciprocation of the knife handle produces a high cutting action with one side, while the reverse side produces a smoothing or planing action on the product being worked upon while the other side is performing with high cutting efficiency. Such alternate high cutting action on one side with a forward push on the knife handle and a reduced cutting action by the opposite side causes a slight lateral rocking action of the knife blade with each series of push and pull movements imparted thereto.

The result of such lateral rocking action of the blade although so slight as not to be noticeable to the user, provides greater cutting efficiency with less effort, and more perfect slicing of meats, fruits, vegetables, cake and the like. Accordingly, it is an object of my invention to provide a knife which is more efficient in action and easier to use than knives now on the market for slicing any of the aforementioned foods.

With the above and other objects in view my invention consists in the features of construction, combination and arrangement of the component features as hereinafter described and claimed in reference to the accompanying drawings, wherein;

Fig. 1 is a broken side elevational view of my novel knife blade construction;

Fig. 1a is a broken side elevation of the opposite side of the knife blade with the handle portion to the right of the drawing;

Fig. 2 is a bottom plan view of the cutting edge;

Fig. 3 is a fragmentary perspective view of the blade with the cutting edge turned up;

Fig. 4 is an enlarged fragmentary detailed side view of the teeth and adjacent grinding curves and indentations; and Fig. 5 is an exaggerated cross sectional view taken on the line 5—5 of Fig. 4.

Like numerals indicate like parts and features of construction in all the figures of the drawings in the following detailed description.

Referring to the drawing and first with particular reference to Figs. 1 and 2, there is illustrated a preferred embodiment of my invention comprising a knife with a handle 9 and a blade 10 having an elongated non-cutting edge 11 and a serrated cutting edge 12. The serrated edge 12 is formed by milling or grinding teeth 14 therein having a triangular formation with the trailing edge of each respective triangular formation at an angle to said non-cutting edge 11, see Fig. 4, which may range from five degrees to eighty-five degrees to the longitudinal axes of the blade 10 depending upon the ultimate use or material to be cut thereby. Thus different angular cutting teeth may be used for various cutting uses.

After the blade 10 has been provided with the teeth 14, same is provided with relatively shallow lateral deflections or ridges 15, adjacent the toothed edge thereof with intervening depressions 16 at each side of the blade with a resulting sinuous cutting edge as is indicated particularly in Fig. 2.

As is indicated more particularly in Fig. 2, the ridges 15 on each side of the blade are opposite and in symmetrical relation to the depressions 16 at the opposite side of the blade.

As is clearly indicated in Figs. 1, 1a and 4 the ridges merge into the planes of the opposite sides of the blade in substantially semi-circular lines 17 which terminate substantially at the roots of the teeth 14 and between which the said depressions 16 are disposed.

After the formation of the teeth 14 and the ridges 15 and intervening depressions 16, the blade 10 is tempered for the retention of a sharp cutting edge after the blade grinding operation. In the course of the blade grinding operation, the teeth 14 are ground to a sharp cutting edge as is indicated in Fig. 5 and in which operation the ridges 15 are partially ground off with resulting plane surfaces 18 of generally semi-tear-drop formation converging downwardly into the ground side edges of the teeth 14 (Fig. 5). The axes of the said semi-tear-drop surfaces 18 are substantially in the roots of adjacent teeth 14 and at the ends of said semicircular lines 17 and the curved boundary lines 19 of the semi-tear-drop surfaces 18 include arcs of relatively small radius and arcs of relatively large radius and the line 19 spaced from the semi-circular lines 17 with resulting generally lunar shaped ridges 20 (see Fig. 5). It is to be observed that the lunar shaped ridges 20 are bounded by the semi-circular line 17 at their upper edges and at their lower edges are bounded by the upper curved edges of the semi-tear-drop surfaces 18. In the grinding operation, the semi-tear-drop surfaces 18 are in reversed position on the opposite sides of the blade and overlap as is more clearly indicated in Fig. 4 whereby the blade is given a slight lateral rocking movement upon reciprocating cutting action of the knife. The blade as above formed is finally metal plated with chromium or the like to provide an ornamental appearance. However, the blade is originally formed from a strip of tungsten steel and will, because of this material, remain constantly sharp without the dulling results of prior art knives made with various corrugated cutting portions.

Without further description it is believed that the foregoing description clearly describes the present invention and it is to be expressly understood that although the invention has been specifically described, the same is not intended to be limited except by the claim appended hereto.

I claim:

A knife blade having fore and aft ends and having a cutting edge comprising a series of teeth ground on opposite sides to said cutting edge, said blade adjacent its toothed cutting edge being of sinuous formation transversely of the blade and including a series of longitudinally spaced plane surfaces of semi-tear drop form on each side of the blade, said semi-tear drop surfaces each having a longitudinal axis disposed in a line at the roots of said teeth, the semi-tear drop surfaces on each side of the blade longitudinally lapping those on the opposite side of the blade, and the semi-tear drop surfaces extending into the ground side edges of the teeth, the upper edges of said semi-tear drop surfaces being curved and including arcs of relatively small radius and arcs of relatively large radius, the arcs of relatively large radius on one side of the blade being disposed toward the front end thereof and the arcs of relatively large radius on the opposite side of the blade being disposed toward the rear end thereof, and a generally lunar shaped ridge disposed above each tear-drop surface, the lower concave edges of said ridges coinciding with the upper curved edges of the tear-drop surfaces and the upper convex edges of said ridges being defined by arcs of circles.

References Cited in the file of this patent

UNITED STATES PATENTS

| | | |
|---|---|---|
| 437,325 | Barclay | Sept. 30, 1890 |
| 592,961 | Brooks | Nov. 2, 1897 |
| 2,075,310 | Sprague | Mar. 30, 1937 |
| 2,279,833 | Madan | Apr. 14, 1942 |
| 2,596,851 | Hansen | May 13, 1952 |

FOREIGN PATENTS

| | | |
|---|---|---|
| 105,966 | Sweden | Nov. 17, 1942 |
| 106,093 | Sweden | Dec. 8, 1942 |